June 1, 1965 | R. A. SCHULTZ | 3,186,664

YIELDING ANCHORAGE

Filed Jan. 19, 1961

INVENTOR
ROBERT A. SCHULTZ
By Donald G. Dalton
Attorney 3,186,664
Patented June 1, 1965

3,186,664

YIELDING ANCHORAGE

Robert A. Schultz, Pittsburgh, Pa., assignor to United States Steel Corporation, a corporation of New Jersey Filed Jan. 19, 1961, Ser. No. 83,810
2 Claims. (Cl. 248—25)

The present invention relates generally to anchoring devices and more particularly to a novel yielding anchorage for protecting rigidly mounted equipment from damage by sudden applications of force.

Many various types of energy-absorbing anchorage devices have been developed and tried prior to my invention but none that I am aware of proved entirely satisfactory. Each of the various types developed possessed certain inherent deficiencies which rendered it ineffective for certain uses. For example, the mechanical energy-absorbing types of anchoring devices, which employ extension or compression springs, are limited in use because in their mode of functioning the absorbed energy is stored and then re-applied to the anchored equipment. Therefore, if the anchored equipment is of delicate construction, considerable damage from the re-applied energy can result. Further, the restraining force of this type of anchoring device progressively increased as the spring was compressed. This rendered the device unacceptable for uses where a constant restraining force was required. The known hydraulic type of energy-absorbing anchoring devices are subject to hydraulic fluid leakage and are easily affected by their environments. Both, the mechanical and hydraulic, types are extremely large, considering the amount of energy they are capable of absorbing.

It is, accordingly, the primary object of my invention to provide a yielding energy-absorbing anchorage for mounting equipment which will rigidly secure the equipment and at the same time protect it from damage by a suddenly applied force.

Another object of my invention is to provide a yieldable energy-absorbing anchorage which does not require springs or fluids as energy-absorbing means.

A further object of my invention is to provide a yieldable energy-absorbing anchorage which is simple and rugged in construction and which may be readily adapted for use in substantially all situations requiring energy-absorbing anchorage means.

Figure 1:
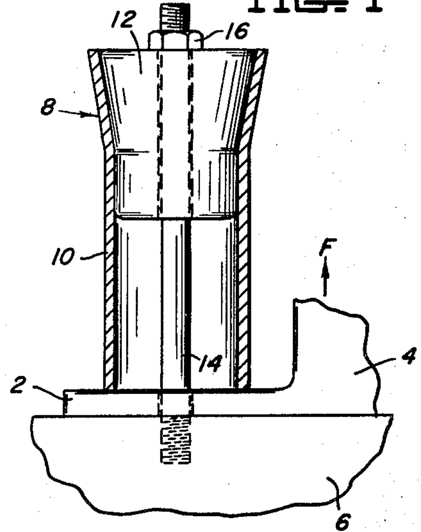
Figure 2:
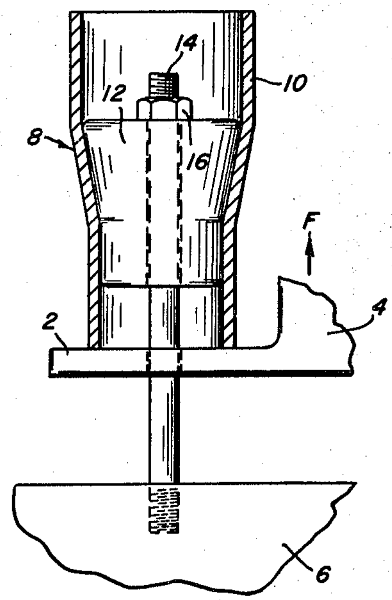

These and other objects will become more apparent after referring to the following specification and attached drawings in which:

FIGURE 1 is an elevational view partly in vertical section showing the device of the invention anchoring a member to a foundation; and FIGURE 2 is a view similar to FIGURE 1 showing the device of the invention in operation.

Referring more particularly to the drawing, reference numeral 2 designates an apertured mounting flange of a unit of equipment 4 mounted on a foundation 6 and attached thereto by means of the yielding anchor of the invention which is designated generally by reference numeral 8.

Yielding anchor 8 includes a deformable metal tube 10, a tapered plug 12, a bolt 14, and a nut 16. Attachment of the unit 4 to the foundation by means of the yielding anchor of the invention is accomplished by passing the bolt 14 through the mounting flange 2 and imbedding one end thereof in the foundation 6. The plug 12 is forced into the top of the tube 10 and the tube is positioned with its bottom resting on the flange 2 and surrounding the exposed portion of the vertically projecting bolt 14. The plug 12 is suitably drilled to accommodate the bolt 14. The nut 16 is then screwed on the upwardly projecting threaded end of the bolt. The nut 16 prevents the plug from moving upwardly when the device of the invention is in operation as will be more fully explained.

If an upwardly directed force F is applied to the unit 4, the tube 10 and the flange 2 will be moved in the same direction as the force. Since the nut 16 prevents the upward movement of the plug 12, the plug remains stationary and the tube is forced over it. This causes the tube to expand and absorb the energy of the force thereby limiting the effect of the force on the equipment. Since the yielding anchor of the invention does not store the absorbed energy, abrupt termination of the force does not result in rebound force being applied to the unit of equipment.

After the force F is eliminated the unit 4 returns by gravity to its normal position resting on the foundation 6, however, the tube 12 remains in raised position as shown in FIGURE 2. At this time the deformed tube 10 is removed from the plug 12 and the nut 16 is removed from the bolt 14. The plug is then removed from the bolt and forced into the top of a new tube. The new tube with the plug therein is then mounted on the bolt with the lower end of the tube resting on the flange 2 as shown in FIGURE 1.

The energy-absorbing rate of the yielding anchor of the invention may be varied or controlled as follows:

(1) The taper angle of the plug may be varied.

(2) The plug and the tube may be made of various materials to obtain a pre-determined amount of friction therebetween.

(3) The contact areas of the plug and tube may be ground to various finishes so as to increase or decrease the friction at these areas.

(4) The wall thickness of the tube may be varied along its length to achieve an increasing or decreasing energy-absorbing rate.

(5) The elasticity of the tube depends upon the elasticity of the metal from which it is made, therefore, the energy-absorbing rate of the device can be varied by varying the metal from which the tube is made.

Although the tube 10 may be fabricated of any suitable metal having elasticity, a metal having a negligible strain rate, such as aluminum, would be most desirable because the velocity or deceleration would not affect the energy-absorbing rate in such a metal. The plug 12 is preferably made of steel or a similar hard substance.

Thus, it will be seen that the yielding anchor of the invention provides an energy-absorbing hold down device which does not require springs or fluids for its two-fold function, viz. firmly secure equipment in position and, at the same time, protect the equipment from damage caused by a sudden application of force. It will also be noted that the device of the invention does not store absorbed energy and can be varied in construction to effect energy absorption at a constant rate or at an increasing or decreasing rate.

While one embodiment of my invntion has been shown and described, it will be apparent that other adaptations and modifications may be made without departing from the scope of the following claims.

I claim:

1. A yielding anchorage for securing a member to a foundation comprising a length of deformable tube disposed with one end bearing against said member, said length of tube being substantially cylindrical in shape and normally of uniform diameter along the greater portion of its length, a tapered plug having a greater diameter end and a lesser diameter end fitted snugly in the end of said tube opposite its bearing end with said greater diameter end substantially level with said opposite end of said tube and said lesser diameter end being cylindrical and disposed inwardly of said tube short of said bearing end of said tube, the portion of said tube containing said plug conforming in shape to the tapered configuration of said plug, the length of said plug being substantially less than the length of said tube, and means securing said plug to said foundation whereby the greater diameter end of said plug is moved inwardly of said opposite end of said tube thereby expanding the diameter of said tube along its length on movement of said member away from said foundation.

2. A yielding anchorage for securing a member to a foundation as defined by claim 1 characterized by said securing means being a bolt extending coaxially through said tube and imbedded in said foundation.

References Cited by the Examiner

UNITED STATES PATENTS

| | | | |
|---|---|---|---|
| 1,155,664 | 10/15 | Lambert | 285—2 |
| 1,473,910 | 11/23 | Lambert | 285—2 |
| 2,631,841 | 3/53 | Tillou | 267—1 |
| 2,931,601 | 4/60 | Johnson | 248—5 |

FRANK L. ABBOTT, *Primary Examiner.*

CORNELIUS D. ANGEL, *Examiner.*